Jan. 9, 1934.  W. L. KEEFER  1,943,220
VIBRATOR
Filed Dec. 28, 1932  2 Sheets-Sheet 1

Inventor
Walter L. Keefer

Witness
H. Woodard

By H. B. Wilson & Co.
Attorneys.

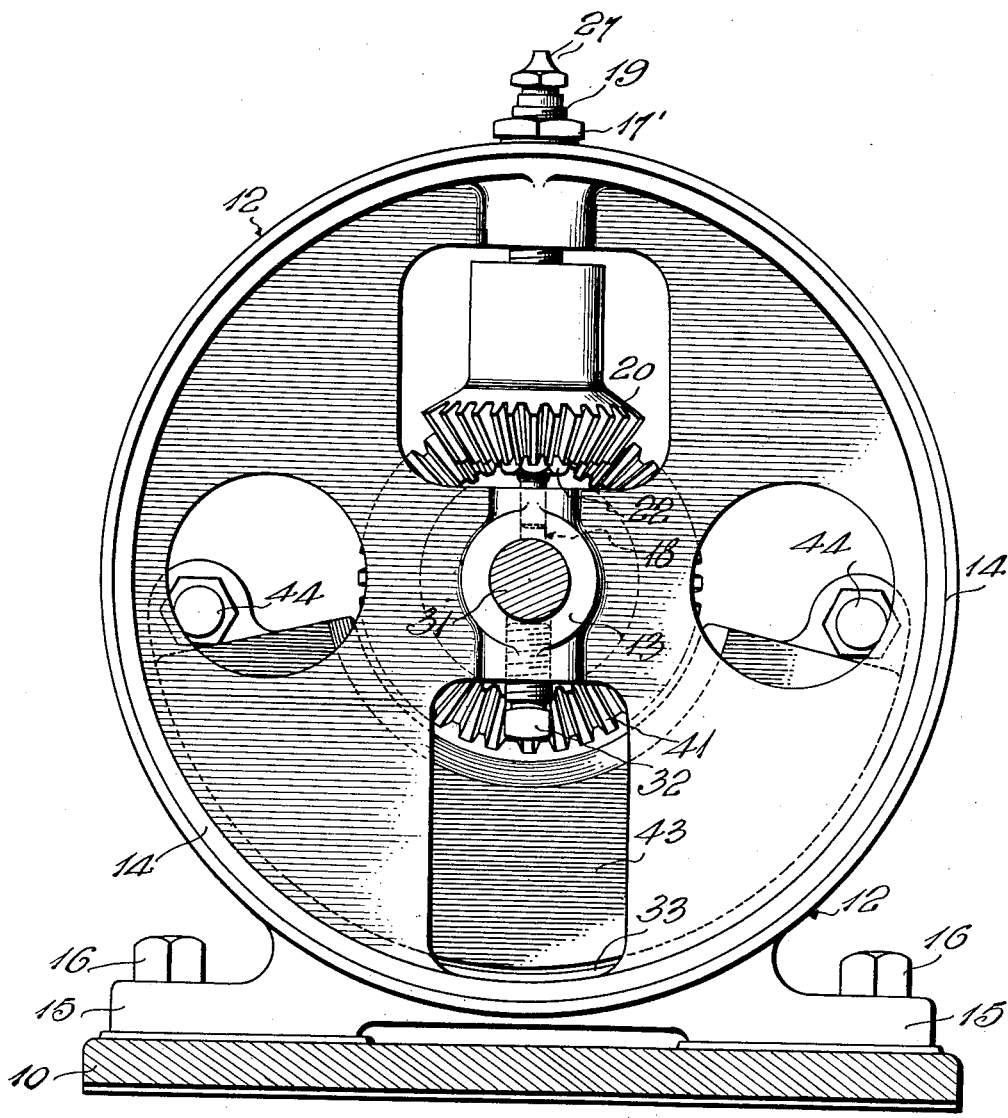

Patented Jan. 9, 1934

1,943,220

UNITED STATES PATENT OFFICE 1,943,220

VIBRATOR

Walter L. Keefer, Chambersburg, Pa., assignor to The Wolf Company, Chambersburg, Pa., a corporation of Pennsylvania Application December 28, 1932
Serial No. 649,213

3 Claims. (Cl. 74—14)

The invention relates to devices for vibrating screens or other members, said device being of the type embodying rotatable unbalanced weights.

The object of the invention is to provide a new and improved device which may be rather easily and inexpensively manufactured, may be easily installed, may be used to advantage with the expenditure of little power, and will be long-lived.

With the foregoing in view, the invention resides in the novel subject matter hereinafter described and claimed, description being accomplished by reference to the accompanying drawings.

Fig. 2 is a transverse vertical sectional view on lines 2—2 of Fig. 1.

Figure 1:
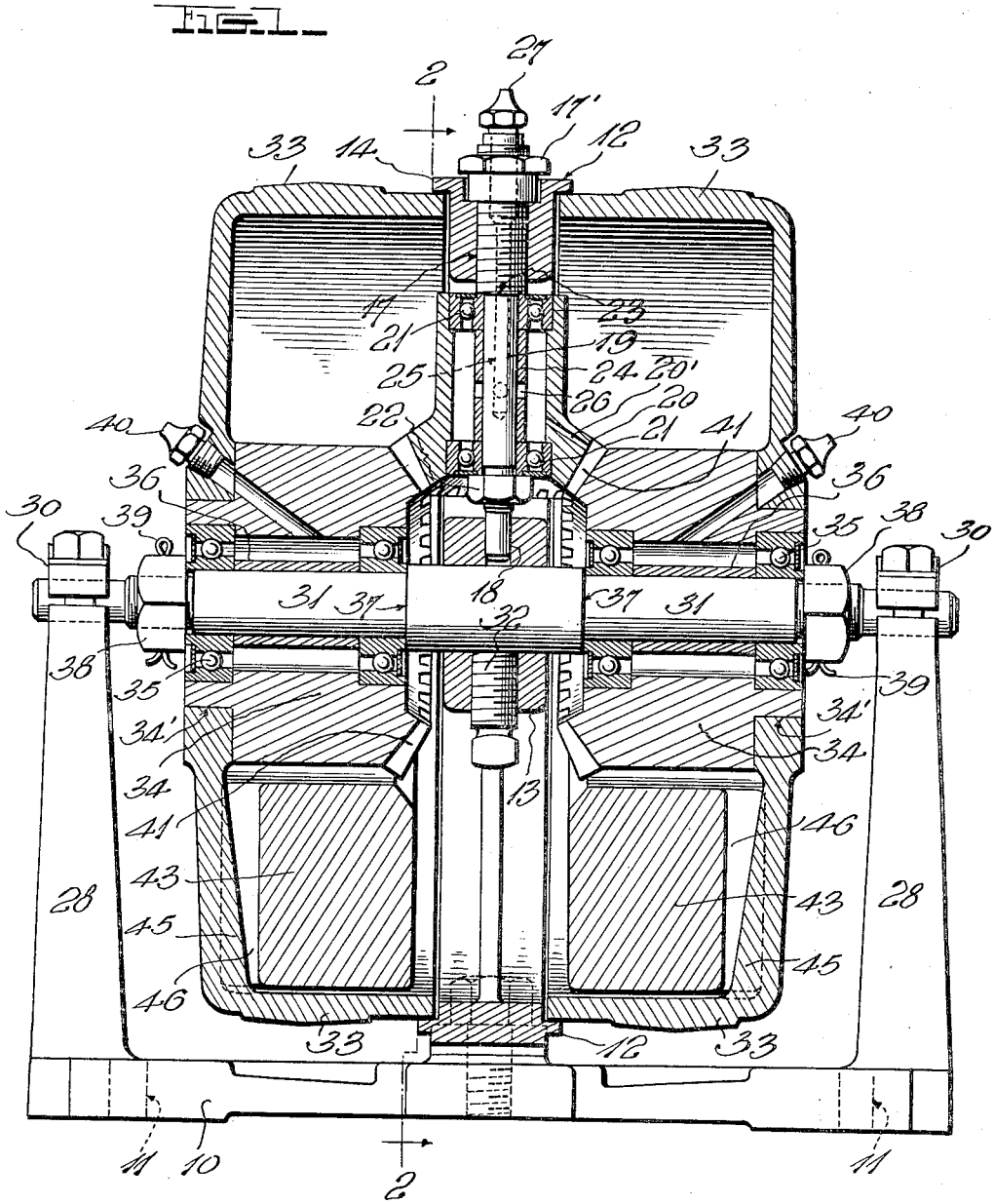
Fig. 1 is a vertical longitudinal sectional view.

In the drawings above briefly described, a preferred construction has been shown, and while said construction will be herein specifically explained, it is to be understood that within the scope of the invention as claimed, variations may be made. Moreover, while I will herein make use of such terms as "vertical", "upper", "lower", "horizontal", etc., it is to be understood that such terms are relative rather than limiting, and that the device may be attached to the frame or the like to be vibrated, in any appropriate position.

The device embodies a flat base 10 having openings 11 to receive bolts for attaching it to the frame or the like to be vibrated. Secured to and projecting upwardly from the base 10 is a spider 12 having a central horizontal bearing or hub 13, and an annular rim 14 concentric with said bearing or hub 13. In the present showing, the lower part of the spider 12 is provided with feet 15 secured by cap screws 16 upon the base 10.

The rim 14 and the bearing or hub 13 are formed with axially alined radially disposed openings 17 and 18, in which a radial shaft 19 is held nonrotatably, said shaft being preferably threaded into the opening 17 and locked by a lock nut 17'. This shaft 19 is instrumental in rotatably mounting a pinion 20 of beveled form, sealed ball or roller bearings 21 being preferably provided between the shaft and pinion, as shown. The assemblage of pinion and bearings, may well be held on the shaft 19 by means of a nut 22 engaging one of said bearings, and holding the other of said bearings against a shoulder 23, there being a spacing sleeve 24 between the two bearings. The shaft 19 and the sleeve 24 are provided with communicating lubricant ports 25 and 26 respectively, and a lubricant-receiving nipple 27 is provided in the outer end of said port 25, allowing lubricant to be easily introduced with a pressure gun, into the hub of the beveled pinion 20. This pinion is preferably formed with a port 20' for supplying lubricant to its teeth and to those of coacting gears hereinafter described.

Two standards 28 are integral with or otherwise secured to the base 10 and project upwardly therefrom at opposite sides of the spider 12. The upper ends of these standards are provided with contractible bearings 30 horizontally alined with the spider hub or bearing 13, and a horizontal shaft 31 of one-piece form, is received in the three bearings 13 and 30, said shaft being non-rotatably held in the present showing, by clamping it in the bearings 30 and by using a set-screw 32 threaded through the bearing or hub 13.

Mounted upon the shaft 31 at opposite sides of the spider 12, are two cupped belt pulleys 33 having their cupped sides presented toward said spider. The hubs 34 of the these pulleys preferably have a pressed fit at 34' with the side walls of said pulleys, and within said hubs are sealed ball or roller bearings 35 which are spaced apart by sleeves 36, the assemblages of sleeves and bearings being held against shoulders 37 on the shaft 31, by nuts or the like 38 upon said shaft, both nuts being preferably provided with locking means 39. Lubricant-receiving nipples 40 communicate with the interiors of the hubs 34, and lubricant may readily be supplied through said nipples, by means of a pressure gun. The pulley hubs 34 are provided with beveled gears 41 preferably integral therewith and meshing with the beveled pinion 20.

Within the cupped pulleys 33, are two off-center weights 43 secured to said pulleys by bolts or the like 44, each weight being preferably of about one-hundred and twenty degrees in length. If the pulleys 33 be provided with internal reinforcing ribs such as those shown at 45 in the present disclosure, the weights 43 may be grooved at 46 to receive said ribs.

The base 10 is bolted to the frame or the like to be vibrated, and a belt driven in either direction may be engaged with either of the pulleys 33, which pulleys have their rims in running contact or substantially in contact with the rim 14 of the spider 12 to exclude foreign matter. The driven pulley causes its beveled gear 41 to drive the beveled pinion 20, thus causing this pinion to drive the other beveled gear 41 thereby rotating the other pulley in the opposite direction. During rotation of the two pulleys, the off-center weights 43 set up such forces as to produce the requisite vibration.

By providing the novel construction shown and described, a device is provided having all necessary rigidity, in which connection, attention is invited to the fact that the main shaft is held by three bearings. The present structure also eliminates a great deal of dead weight previously embodied in similar vibrators, and the drive is practically fool-proof as far as lubrication is concerned. The grease reservoirs may be filled when the drive is manufactured, and the sealed antifriction bearings will continue to properly function for a long period of time without requiring additional lubrication. The weights being housed within the cupped pulleys, there is little chance of these weights loosening, and even if they should severely loosen, they cannot fly by centrifugal force with danger of injuring anyone. The central spider forms a rigid support in the center of the drive and absorbs the greater part of the pull or thrust, and at the same time co-acts with the rims of the pulleys in establishing an effective seal to exclude foreign matter.

While the specific features of construction herein disclosed, are well adapted to carrying out the desired end, attention is again invited to the possibility of making variations, within the scope of the invention as claimed.

I claim:—

1. A vibrating device comprising a base, a spider secured to and projecting upwardly from said base, said spider having a horizontal bearing and an annular rim concentric with said bearing, two standards secured to and projecting upwardly from said base at opposite sides of said spider, said standards having bearings alined horizontally with said spider bearing, a horizontal shaft received in the three bearings, two relatively rotatable axially alined cupped pulley having hubs mounted on said shaft between said standards and said spider, said pulleys having their cupped sides disposed toward said spider, the rims of said pulleys being annular, being concentric with said hubs and being disposed substantially in running contact with opposite sides of said annular rim of said spider, off-center weights secured within said cupped pulleys, axially alined beveled gears carried by said hubs of the pulleys and disposed adjacent said spider, and a beveled pinion mounted radially on said spider within the confines of the cupped pulleys and meshing with said beveled gears.

2. A vibrating device comprising a base, a spider secured to and projecting upwardly from said base, said spider having a horizontal bearing and an annular rim concentric with said bearing, said rim and said bearing having radially alined openings, two standards secured to and projecting upwardly from said base at opposite sides of said spider, said standards having bearings alined horizontally with said spider bearing, a horizontal shaft received in the three bearings, two relatively rotatable axially alined cupped pulleys having hubs mounted on said shaft between said standards and said spider, said pulleys having their cupped sides disposed toward said spider, the rims of said pulleys being annular, being concentric with said hubs and being disposed substantially in running contact with opposite sides of said annular rim of said spider, off-center weights secured within said cupped pulleys, axially alined beveled gears carried by said hubs of the pulleys and disposed adjacent said spider, a beveled pinion between said bearing and said rim of said spider and meshing with said beveled gears, and a radial shaft on which said beveled pinion is mounted, said radial shaft being received in said openings of the spider rim and bearing.

3. A vibrating device comprising a base, a spider secured to and projecting upwardly from said base, said spider having a central horizontal bearing and an annular rim concentric with said bearing, a horizontal shaft having its central portion rigidly and non-rotatably held in said bearing, two relatively rotatable axially alined cupped pulleys having hubs mounted on said shaft at opposite sides of said spider, said pulleys having their cupped sides disposed toward said spider, the rims of said pulleys being annular, being concentric with said hubs and being disposed substantially in running contact with opposite sides of said annular rim of said spider, off-center weights secured within said cupped pulleys, and gearing operatively connecting the two pulleys and carried partly by said spider and partly by said hubs.

WALTER L. KEEFER.